United States Patent [19]

Akin, Jr. et al.

[11] Patent Number: 5,544,135
[45] Date of Patent: Aug. 6, 1996

[54] FAULT TOLERANT SERVO ADDRESS MARK FOR DISK DRIVE

[75] Inventors: William R. Akin, Jr., Morgan Hill; Trinh C. Bui, Santa Ana; both of Calif.

[73] Assignee: Quantum Corporation, Milpitas, Calif.

[21] Appl. No.: 321,307

[22] Filed: Oct. 11, 1994

[51] Int. Cl.⁶ .......................... G11B 17/22; G11B 5/09; G11B 5/596
[52] U.S. Cl. .......................... 369/32; 360/46; 360/77.08; 360/77.14
[58] Field of Search ............................ 369/32, 44.26, 369/44.28, 44.38, 44.39; 360/46, 68, 61–62, 39–40, 49, 51, 77.01, 77.02, 77.04, 77.05, 77.08, 77.14

[56] References Cited

U.S. PATENT DOCUMENTS

| | | | |
|---|---|---|---|
| 4,823,212 | 4/1989 | Knowles et al. | 360/77.08 |
| 5,134,366 | 7/1992 | Kirk | 324/210 |
| 5,168,395 | 12/1992 | Klaassen et al. | 360/46 |
| 5,231,545 | 7/1993 | Gold | 360/49 |
| 5,255,136 | 10/1993 | Machado | 360/77.02 |
| 5,384,671 | 1/1995 | Fisher | 360/51 |

OTHER PUBLICATIONS

Klaassen et al., "Barkhausen Noise in Thin–Film Recording Heads" *IEEE Trans. on Magnetics* vol. 26, No. 5, Sep. 1990, pp. 1697–1699.

"Fault–Tolerant Index Detection Pattern for Hard Disk Files", *IBM Tech. Discl. Bull.* vol. 29, No. 12, May 1987, pp. 5350–5351.

Primary Examiner—Ali Neyzari
Attorney, Agent, or Firm—David B. Harrison

[57] ABSTRACT

Apparatus and method for detecting occurrence of a non-pulse interval of predetermined length between a beginning pulse and an ending pulse as included within a sequence comprising a unique timing mark within a stream of pulses supplied from a source with a state machine. The method of the state machine includes the the steps of:

advancing through a plurality of nominal states marking in time the non-pulse interval, branching to one of a plurality of available spurious pulse states from one of the nominal states upon detection of a first unexpected pulse, returning to advance through predetermined remaining ones of the plurality of nominal states following detection of the first unexpected pulse, reaching a completion state following the nominal states if only the first unexpected pulse is detected, and reaching an error state following a branch to another one of the plurality of available spurious pulse states upon detection of a second unexpected pulse within the non-pulse interval.

11 Claims, 12 Drawing Sheets

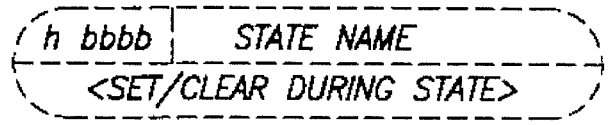

h: STATE NUMBER IN HEX
bbb: STATE NUMBER IN BINARY

BIT DESCRIPTION:
  ENDSEC – SECTOR TIMER = END OF SECTOR VALUE
  WEDGE – ASIC WEDGE OUTPUT
  AGCHOLD – ASIC AGC HOLD OUTPUT
  WRREC – SECTOR TIMER = WRITE TO READ RECOVERY
  ENASSD – ENABLE SYNC AND SAM DETECTOR (SSD)
  ENADR – ENABLE DATA READER (DR)
  INDEX – ASIC INDEX OUTPUT
  LDAGCON – LOAD AGCOn VALUE IN DELAY TIMER (DT)
  DLYDONE – DELAY TIMER DONE SIGNAL FROM DT
  FINDMODE – TNA FIND MODE OPERATION
  SYNCERR – SYNC ERROR DETECTED BY SSD
  MSSYNCERR – SYNC ERROR POSTED TO REGISTER
  DETSYNC – VALID SYNC DETECTED BY SSD
  SAMERR – SAM ERROR DETECTED BY SSD
  MSSAMERR – SAM ERROR POSTED TO REGISTER
  DET14T – VALID 14T (OR 9T) DETECTED BY SSD
  GOOD – GENERATED ONCE PER TRACK BIT TO INDICATED THAT
    THE DATA READER HAS READ A BIT.
  DATA – A DATA BIT ONE WAS RECOGNIZED BY THE DATA READER.
    DATA ACCOMPANIES GOOD FOR A TRACK BIT ONE AND IS
    ABSENT FOR A TRACK BIT ZERO.
  DATAERR – DATA ERROR DETECTED BY DR
  MSDATAERR – DATA ERROR POSTED TO REGISTER
  SAM – SERVO ADDRESS MARK DETECTED BY MASTER STATE
  TRKNUM – TRACK NUMBER REGISTER
  ENATRK – ENABLE TRACK NUMBER SHIFT REGISTER
  TRKDONE – SHIFT REGISTER DONE READING TRACK NUMBER
  LDDLYTOA – LOAD DELAY TO A VALUE INTO DT
  SRV_STB – SERVO STROBE OUTPUT
  LDABCON – LOAD ABC ON VALUE INTO DT
  TIMESUP – SECTOR TIMER = (TIMES UP OR TIMES UP RELOAD)
  LDDLYTOBC(D) – LOAD DELAY TO BC(D) INTO DT

*FIG. 5C*

| BURST MODE | BURSTS SAMPLED (SEV_STB ASSERTED) | BURST READY ASSERTED AFTER BURST: |
|---|---|---|
| 0000 | B,C | B |
| 0001 | A,C | B |
| 0010 | A,B | A |
| 0011 | A,B,C | A |
| 0100-0111 | NOT IMPLEMENTED | NOT IMPLEMENTED |
| 1000 | B,C,D | B |
| 1001 | A,C,D | B |
| 1010 | A,B,D | B |
| 1011 | A,B,C | B |
| 1100 | A,B,C,D | B |
| 1101-1111 | NOT IMPLEMENTED | NOT IMPLEMENTED |

*FIG. 5D*

FAULT TOLERANT SERVO ADDRESS MARK FOR DISK DRIVE

FIELD OF THE INVENTION

The present invention relates to providing a fault tolerant servo address mark within a hard disk drive. More specifically, the present invention relates to methods and apparatus for providing tolerance to noise events, including Barkhausen noise, within a servo address mark detection sequence in a disk drive.

BACKGROUND OF THE INVENTION

Modern disk drive designs typically embed a certain amount of overhead information, such as servo head position information and data identification fields for example, within the concentric data storage tracks of a disk drive. Usually, this embedded information is recorded in evenly spaced apart areas or "sectors" of the track, and in some cases interrupts fixed-length user data blocks otherwise recorded in the tracks. The embedded servo information typically includes servo head position and track/data identification fields, and also typically includes a unique servo address mark pattern which is provided to enable resynchronization of timers for recovering the servo head position and the track/data identification field information, and which mark in time expected arrival of the next embedded servo sector. Reliable and robust detection of the servo address mark pattern in each servo sector is essential for precisely marking in time not only the servo sector and its head positioning information fields, but also the following user data storage area.

When embedded overhead information is present within the storage track, a selected head following the track will alternately switch between reading or writing user data, and reading the overhead information. Because of the desire to increase data storage density, the guard bands and gaps heretofore provided between user data and embedded overhead information are continually being narrowed to reduce embedded overhead, and the active user data storage area is being placed closer and closer to the overhead information, in order to gain further user data storage capacity within the limited area of the data storage surface.

One drawback associated with modern data transducer structures occurs during a switch-over from writing to reading. Typically, switchover occurs when a write-enable control line becomes false. When this abrupt switch-over edge occurs, writing current is suddenly removed from the head structure, leaving behind marginally stable magnetic domain patterns within the head structure, particularly the poles and pole tips. These marginally stable magnetic domain patterns may subsequently rearrange themselves into more stable patterns, and in the process of doing so release energy, as the magnetic structure relaxes following writing. The released energy within the head structure becomes manifested electrically as electrical voltage noise spikes known in the art as Barkhausen noise or "popcorn" noise. Barkhausen noise spikes create spurious voltage spikes in the analog electrical signal stream present in the read channel from the head. While Barkhausen noise events may occur in ferrite heads, metal-in-gap heads, and thin film inductive heads, it is very prevalent in thin film inductive head structures. A scientific investigation of Barkhausen noise phenomena is reported upon by K. B. Klassen and JCL. von Peppen in "Barkhausen Noise in Thin-Film Recording Heads", *IEEE Trans. on Magnetics*, Vol. 26, No. 5, Sep. 1990, pp. 1697–1699.

Since the spikes occur following a switchover from writing to reading as at a servo sector, the spikes may corrupt the embedded overhead data including a servo address mark. If a servo address mark is corrupted or misdetected, subsequent events may become mistimed leading to possible overwrite of a servo sector or mis-synchronization to, or misdetection of, the servo and/or user data. The data corruption resulting from random Barkhausen noise events is not predictable, because the occurrence or precise location of the Barkhausen noise event relative to the switch-over point is unpredictable.

There have been several attempts to minimize the impact of Barkhausen noise upon disk drive operations. Depending upon the predicted location of the write-to-read transition, error correction techniques may be employed to remove the Barkhausen noise corruption of ensuing data being read back. One prior approach calls for tapering off the write current in a controlled fashion, such as in a decaying exponential curve, in an attempt to control magnetic recording head relaxation following a writing operation in a magnetic recording system, such as a disk drive. One example of this approach is given in U.S. Pat. No. 5,168,395 to Klassen et al., entitled: "Controlled Magnetic Recording Head Relaxation in a Magnetic Recording System." One readily apparent drawback of the Klassen et al. approach is that it requires further overhead space on the disk surface during the time interval following switchover from write mode to read mode when the head's magnetic structure is undergoing controlled relaxation.

Another approach, described in copending, commonly assigned U.S. patent application Ser. No. 08/137,807 by Gold, entitled: "Data Block Sequencing Using ID After Embedded Servo Sector in Disk Drive", called for placing the user data block ID field in a position immediately following each embedded servo sector. Thus, if a Barkhausen noise event occurred following switchover from writing to reading at a servo sector, the event would most likely occur before user data was again reached following the servo sector information and the immediately following user data block ID information. While this approach resulted in greater user data integrity than before, a problem of a Barkhausen noise event occurring during the servo address mark field remained unresolved.

Thus, a hitherto unsolved need has remained for a way of increasing data storage capacity by reducing the overhead space, while still permitting effective disk drive operations to recover embedded servo address marks even in the presence of some Barkhausen noise events.

SUMMARY OF THE INVENTION WITH OBJECTS

One general object of the present invention is to provide a servo pattern detector which withstands detection of one unexpected pulse within a servo address mark pattern sequence without failing to detect the pattern in a manner overcoming limitations and drawbacks of the prior art.

Another more specific object of the present invention is to provide an improved servo address mark detector for a disk drive with increased immunity to extraneous pulses, as caused by Barkhausen noise events emanating from the magnetic write/read head structure.

A further specific object of the present invention is to provide an improved state machine for tracking extended non-pulse intervals within a servo address mark pattern in a manner enabling receipt of one extraneous pulse within an interval without loss of tracking.

In accordance with one aspect of the present invention, a method is provided for decoding a data pulse sequence from a stream including a servo address mark pattern following a synchronization pattern comprising a repetitive sequence of data pulses, wherein the servo address mark pattern nominally comprises a first non-pulse interval of predetermined length following the synchronization pattern and ending with an interval ending pulse, with fault tolerance for a spurious data pulse occurring during the first non-pulse interval. The method includes the steps of:

detecting a last data pulse of the synchronization pattern nominally marking a beginning of a first non-pulse interval of the servo address mark pattern, progressively monitoring the stream to determine that the synchronization pattern has ended, continuing to monitor the stream to determine that no unexpected data pulses occur during the first non-pulse interval, detecting an unexpected pulse during the first non-pulse interval occurring following the step of determining that the synchronization pattern has ended, flagging presence of the detected unexpected pulse, and continuing to monitor the stream to detect the interval ending pulse, and thereupon signaling successful detection of the first non-pulse interval.

In accordance with another aspect of the present invention, a method is provided for detecting occurrence of a non-pulse interval of predetermined length between a beginning pulse and an ending pulse as included within a sequence comprising a unique timing mark within a stream of pulses supplied from a source with a state machine. The method comprises the steps of:

advancing through a plurality of nominal states marking in time the non-pulse interval, branching to one of a plurality of available spurious pulse states from one of the nominal states upon detection of a first unexpected pulse, returning to advance through predetermined remaining ones of the plurality of nominal states following detection of the first unexpected pulse, reaching a completion state following the nominal states if only the first unexpected pulse is detected, and reaching an error state following a branch to another one of the plurality of available spurious pulse states upon detection of a second unexpected pulse within the non-pulse interval.

As one facet of this aspect of the invention, a plurality of non-pulse intervals are detected by repeating the detection steps for each interval and performing a further step of reaching the error state upon detection of a second unexpected pulse within any one of the non-pulse intervals.

As another aspect of the present invention, a disk drive includes a rotating data storage disk and a transducer positioned to read data from a data track selected from a multiplicity of concentric data tracks defined on a storage surface of the rotating data storage disk, wherein servo sectors are embedded within the data tracks. Within this environment a method is provided for locating the servo sectors by decoding a servo address mark pattern defined within each servo sector and marking a precise radial position of the rotating disk relative to the transducer for resetting a servo sector timer. Each servo sector includes a repetitive sequence of data pulses comprising a sync pattern, and the servo address mark pattern includes a plurality of non-pulse intervals of predetermined length spanned by data pulses. The method achieves fault tolerance for a spurious data pulse occurring during one of the non-pulse intervals by including the steps of:

positioning the transducer over a selected one of the data tracks and reading magnetic flux transitions recorded therein including ones nominally corresponding to one of the servo sectors, converting the magnetic flux transitions into a stream of data pulses, monitoring the stream of data pulses with a sync detection circuit to detect the sequence of pulses comprising the synchronization pattern, monitoring the stream of data pulses with a servo address mark pattern detection circuit to detect a last occurring data pulse of the synchronization pattern nominally marking a beginning of a first non-pulse interval of the plurality thereof, monitoring the stream during the first non-pulse interval to determine that the length thereof corresponds to a predetermined nominal length, detecting a pulse marking an end of the non-pulse interval, monitoring the stream during each subsequent non-pulse interval to determine that the length thereof corresponds to predetermined nominal lengths, signaling detection of the plurality of non-pulse intervals at an end of a last one thereof, setting a flag upon detection of a first unexpected pulse detected during one of the non-pulse intervals without cessation of monitoring, and ceasing to monitor the stream during one of the non-pulse intervals upon detection of a second unexpected pulse.

As a further aspect of the present invention, a disk drive includes a rotating data storage disk and a transducer positioned to read data from a data track selected from a multiplicity of concentric data tracks defined on a storage surface of the rotating data storage disk, servo sectors including a sync pattern, a servo address mark pattern, and head position information embedded within the data tracks, a servo pattern decoder for decoding the sync pattern, the servo address mark pattern, and the head position information, and wherein the servo address mark pattern comprises at least one non-pulse interval spanned by two pulses, and an improved servo address mark pattern detector state machine for detecting the non-pulse interval even in the presence of one unexpected pulse received during the non-pulse interval. The state machine includes a series of sequential nominal states progressively reached by the state machine during each timing increment of the non-pulse interval; a series of noise states, one of which is reached by the state machine upon receipt of the one unexpected pulse during the non-pulse interval; an electrical path leading back from the said one of the series of noise states to a predetermined one of the series of sequential nominal states following receipt of the one unexpected pulse; and, an electrical path leading to an error state from any of the series of sequential nominal states and any of the series of noise states upon receipt during the non-pulse interval of a second unexpected pulse.

As a facet of this aspect of the invention, the servo address mark pattern detector state machine comprises a last nominal state for detecting a pulse marking the end of the non-pulse interval and a process state reached by the state machine after passing through the last nominal state for signaling the servo pattern decoder that the non-pulse interval has been successfully detected.

As another facet of this aspect of the invention, the servo address mark comprises a plurality of sequential non-pulse intervals separated by a pulse and the process state causes the state machine to return to a first of the series of sequential nominal states upon detection by the last nominal state of the pulse marking the end of one of the plurality of non-pulse intervals.

As another facet of this aspect of the invention, the servo address mark pattern detector state machine employs some of its sequential nominal states for detecting the sync pattern.

As a further facet of this aspect of the invention, the state machine includes a plurality last nominal states, one of the last states being reached by the state machine upon detection of the pulse marking the end of the non-pulse interval within plus and minus one pulse timing cell, thereby accommodating a timing shift of the pulse marking the end of the non-pulse interval.

As one more facet of this aspect of the invention, the servo pattern decoder further includes a data reader for reading sequences of pulses and non-pulse intervals comprising data bits forming a track number, the servo address mark pattern comprises a plurality of sequential non-pulse intervals separated by a pulse and ends with a predetermined one of the data bit sequences, and the servo address mark pattern detector state machine comprises a last nominal state for detecting a pulse marking the end of each non-pulse interval, and a process state reached by the state machine after passing through the last nominal state for signaling the servo pattern decoder that the non-pulse interval has been successfully detected; and, the servo pattern decoder enables the data reader to read the predetermined data bit sequence of the address mark pattern upon a signal from the state machine given at the end of the last non-pulse interval. Within this facet of the invention, the servo pattern decoder includes a sector timer for timing an interval between successive adjacent servo sectors, and the servo pattern decoder resets the sector timer when the data reader has read the predetermined data bit sequence ending the servo address mark pattern being read.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
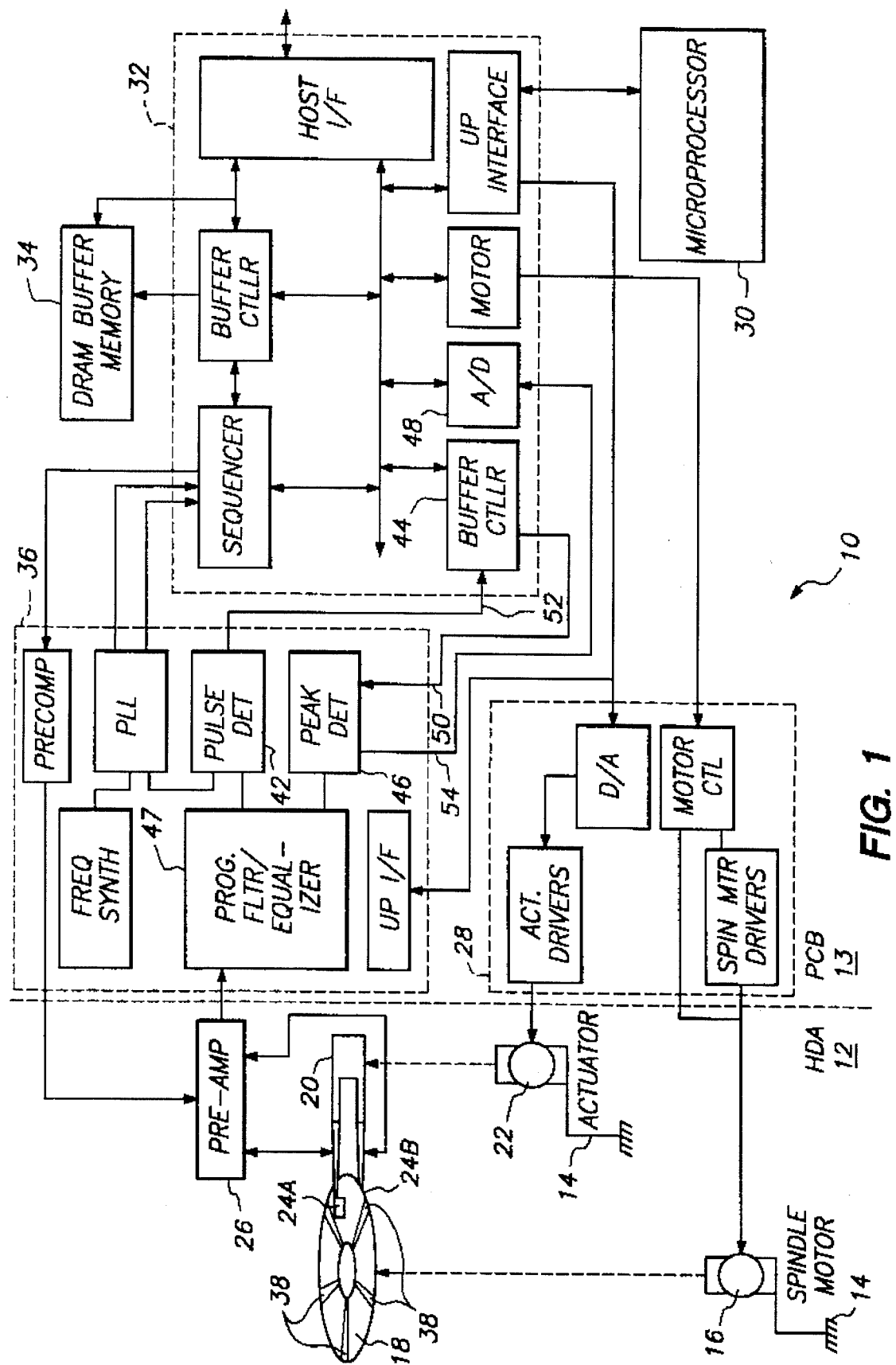
FIG. 1 is a highly diagrammatic block diagram of a hard disk drive which makes use of a fault tolerant address mark detection circuit in accordance with principles of the present invention.

In the context of the present invention, a method and apparatus are provided for detecting a servo address mark within a hard disk drive. Accordingly, a hard disk drive 10 incorporating the servo address mark detection principles of the present invention is illustrated in overview in FIG. 1. In FIG. 1 only those elements which are directly pertinent to an understanding of the present invention are given reference numerals. Those skilled in the art will understand that the other illustrated elements which are not discussed are needed for operation of the disk drive 10 in its intended fashion. The functions of the labeled but undiscussed elements may be found in commonly assigned U.S. Pat. No. 5,255,136 to Machado et al., entitled: "High Capacity Sub-microWinchester Fixed Disk Drive, the disclosure thereof being incorporated herein by reference.

As illustrated in FIG. 1, the hard disk drive 10 includes a head and disk assembly (HDA) 12, and a printed circuit board (PCB) 13 which is typically mechanically attached, and electrically connected, to the HDA 12 in a wide variety of suitable arrangements. The PCB 13 typically carries elements of the drive electronics illustrated in the FIG. 1 block diagram. The HDA 12 includes a base 14, a spindle motor 16 formed in, or fixedly attached to the base 14, and at least one data storage disk 18 rotated by the spindle motor 16 at a predetermined angular velocity. A rotary voice coil actuator structure 20 includes a voice coil motor 22 including a moving coil and a magnet assembly also secured to the base 14. The rotary actuator 20 positions e.g. two data transducer heads 24A and 24B among a multiplicity of concentric data tracks formed on each major surface of the disk 18, there being a single head 24 associated with each disk storage surface. The multiplicity of concentric data tracks on each surface are interrupted by a series of circumferentially spaced apart, embedded servo sectors 38 in what is known in the art as "embedded sector servo", described in greater detail below in connection with FIG. 2. The servo sectors 38 provide discrete samples of critical head positioning and timing information, including a fault tolerant servo address mark pattern which is detected in accordance with principles of the present invention.

While two heads and data surfaces are shown in FIG. 1, those skilled in the art will appreciate that a head 24 is associated with each available data storage surface, and is positioned in unison with movement of all heads by the rotary actuator 20. The HDA 12 also includes a preamplifier/write driver/head select circuit 26 which is typically mounted to a flexible film circuit substrate in as close a proximity to the heads 24 as practical in order to improve signal to noise ratio.

The PCB 13 includes, for example, five integrated circuit components, together with a plurality of control, address and data buses and paths. A motor driver chip 28 provides analog driving signals to operate the spindle motor 16 and to operate the voice coil motor 22 of the rotary actuator 20. A programmed digital microcontroller 30 is provided to exercise overall control of the disk drive 10 in accordance with firmware routines stored in reserved data track locations of the disk 18 and in on-board read only program memory space. A digital drive electronics chip 32 includes all of the major solid-state digital data handling functions within the disk drive, including a sequencer, a buffer memory controller, a host interface, a microprocessor interface, a motor control. The disk drive digital electronics chip 32 also includes a servo pattern decoder circuit 44 and an analog to digital converter circuit 48 which are discussed hereinbelow in greater detail.

The PCB 13 also includes a DRAM buffer memory array 34 which provides temporary storage for data blocks in transit between a host computing system (via a bus 33) and the storage locations of the disk 18. The DRAM buffer memory 34 also stores much of the disk drive firmware executed by the microprocessor 30 in supervising operations of the disk drive. This firmware is downloaded from reserved data storage locations on the disk 18 during a power-on initialization routine of the disk drive 10. The microprocessor 30 has a direct access channel via the disk drive control electronics chip 32 to the DRAM buffer memory 34, and can obtain and execute firmware control instructions stored therein. (The microprocessor 30 has a resident read only memory program which includes certain routines needed at power-on initialization to cause the disk drive 10 to transfer the drive control firmware to the DRAM buffer 34, so that it may then be directly accessed and executed by the microprocessor 30).

Finally, the PCB 13 includes a read/write data channel circuit 36 which includes a write precompensation function, a programmed frequency synthesizer, a phase locked loop data separator, a programmed filter/equalizer, a microprocessor interface, and a pulse detector 42 and a peak detector 46. The pulse detector 42 provides asynchronous, shaped data pulses to the servo decoder 44 via a path 52. The servo detector detects a servo address mark and generates precise timing window signals for servo coarse position data recovery, and for relative peak amplitude measurements of amplitude burst fields and provides the timing window signals to the pulse detector 46 via a path 50. Peak amplitude values from each servo burst within the servo sector 38 being read are sent to the analog to digital converter 48 over a signal path 54 and converted into digital values which are then sent onto the microprocessor 30 for processing into head position error correction values for delivery to the actuator motor 22 as part of the head position servo control loop function.

Figure 2:
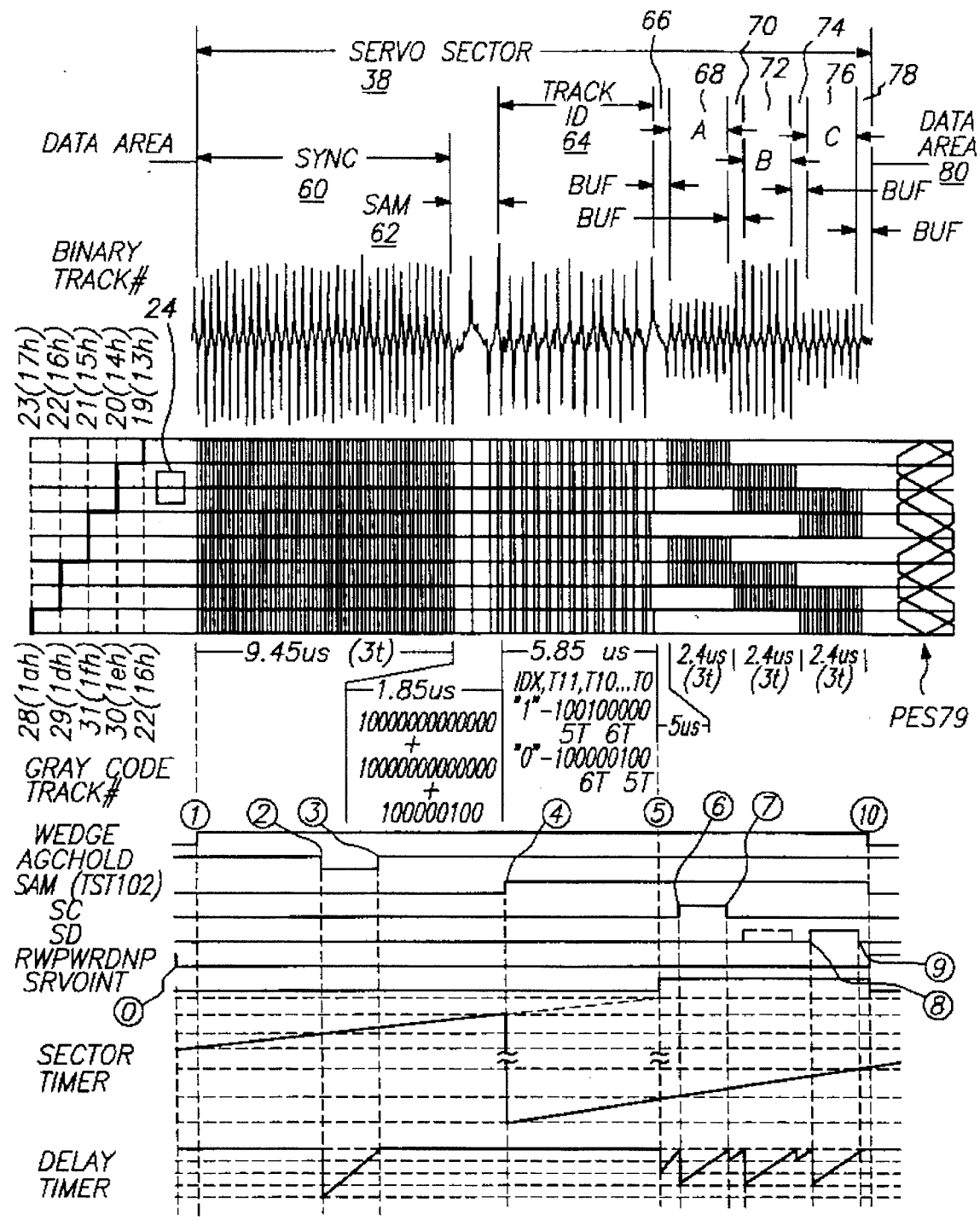
FIG. 2 is a set of servo sector waveform, magnetic pattern and timing diagrams along a common time base and illustrating servo sector layout and generation of timing signals needed to detect servo information within each servo sector, and to mark the beginning of each user data area following each embedded servo sector of the FIG. 1 disk drive.

With reference to FIG. 2, each embedded servo sector 38 typically includes a sync field 60 having a constant amplitude high frequency flux reversal pattern irrespective of radial head position, followed by a servo address mark field 62 (which will be discussed in greater detail hereinbelow), followed by a Gray coded track identification number field. These fields are followed by a short buffer area 66, a first amplitude or A burst field 68, a second short buffer area 70, a second amplitude or B burst field 72, a third short buffer area 74 and a third amplitude or C burst field 76. The C burst field 76 is followed by a write/splice buffer area 78 which leads directly to a beginning, or resumption, of a user data field 80 which extends to the next embedded servo sector. The A, B and C burst fields are arranged to be sequential in time and are recorded to be radially staggered as shown in FIG. 2. The amplitude graphs noted by reference numeral 79 at the right side of the magnetic flux transition patterns graphed in FIG. 2 represent relative amplitude read by the head 24 in function of radial displacement relative to the bursts. Each amplitude includes a series of flat or saturation regions in which head position cannot be resolved by a particular burst, and so a different burst edge is selected in accordance with the teachings of commonly assigned U.S. Pat. No. 5,170,299 to Moon, entitled: "Edge Servo for Disk Drive Head Positioner", the disclosure thereof being incorporated herein by reference. In practice, the disk 18 may include as many as e.g. 62 embedded servo sectors 38, or more, although only five such sectors are depicted on the disk 18 in the FIG. 1 diagrammatic view.

In the digital waveforms of FIG. 2, the waveform labeled "wedge" is asserted true throughout the duration of each servo sector 38 (as "wedge" has come to be synonymous with "servo sector" in the hard disk drive art). The signal "AGC hold" is asserted during the sync field 60 in order to hold a gain setting within the read/write channel circuit 36 during the servo sector 38. A delay timer 90 (FIG. 3) counts a hold interval during the AGC hold interval.

As recorded at the servo writer station during manufacturing, the SAM field 62 nominally includes two 14T patterns followed by a data bit zero pattern, or 000 0000 0000 001+000 0000 0000 001+000 010 0. This pattern is shown in the analog domain in the expanded time base graph of FIG. 3. An alternative and shorter SAM field 62 is realized if 9T patterns are used in lieu of 14T patterns. If the SAM field 62 is recorded with 9T patterns, the nominal SAM pattern is two 9T patterns followed by a data bit zero pattern, or 000 0000 01+000 0000 01+000 010 0.

In accordance with aspects of the present invention, if a servo address mark (SAM) is detected with fault tolerance, following reading of the SAM field 62, a SAM signal is enabled for the duration of the servo sector interval. Successful SAM detection is shown in the digital waveform labeled "SAM (TST102)" in FIG. 2. Servo amplitude burst sampling intervals SC and SD are also generated to sample the A burst field 68 and either the B burst field 72 or the C burst field 76, in accordance with the teachings of the referenced U.S. Pat. No. 5,170,299.

If the servo address mark pattern recorded in the SAM field 62 is detected by the servo decoder 44, a sector timer 92 (FIG. 4) is restarted, and begins counting to mark timing known intervals as the head 24 traverses the disk. Restarting of the sector timer 92 is depicted in FIG. 2 by the digital waveform labeled "Sector Timer" (solid line portion). In the event that the servo address mark pattern is not detected, even though fault tolerance has been applied in the detection process, the sector timer will be automatically cleared and restarted, not later than the end of the track ID number field 64 per the digital waveform also labeled "Sector Timer" (dashed line portion). In this way, an approximate count may be generated to mark a time interval to a next servo sector 38n+1, even though the servo address mark pattern of the SAM field 62 in the presently read servo sector 38 is not successfully detected. The delay timer 90 counts delays for each of the buffer intervals 66, 70, 74 and 78, and for the three burst fields 68, 72 and 76. The delay timer active counting intervals are graphed as the digital waveform labeled "delay timer" in FIG. 2.

Figure 3:
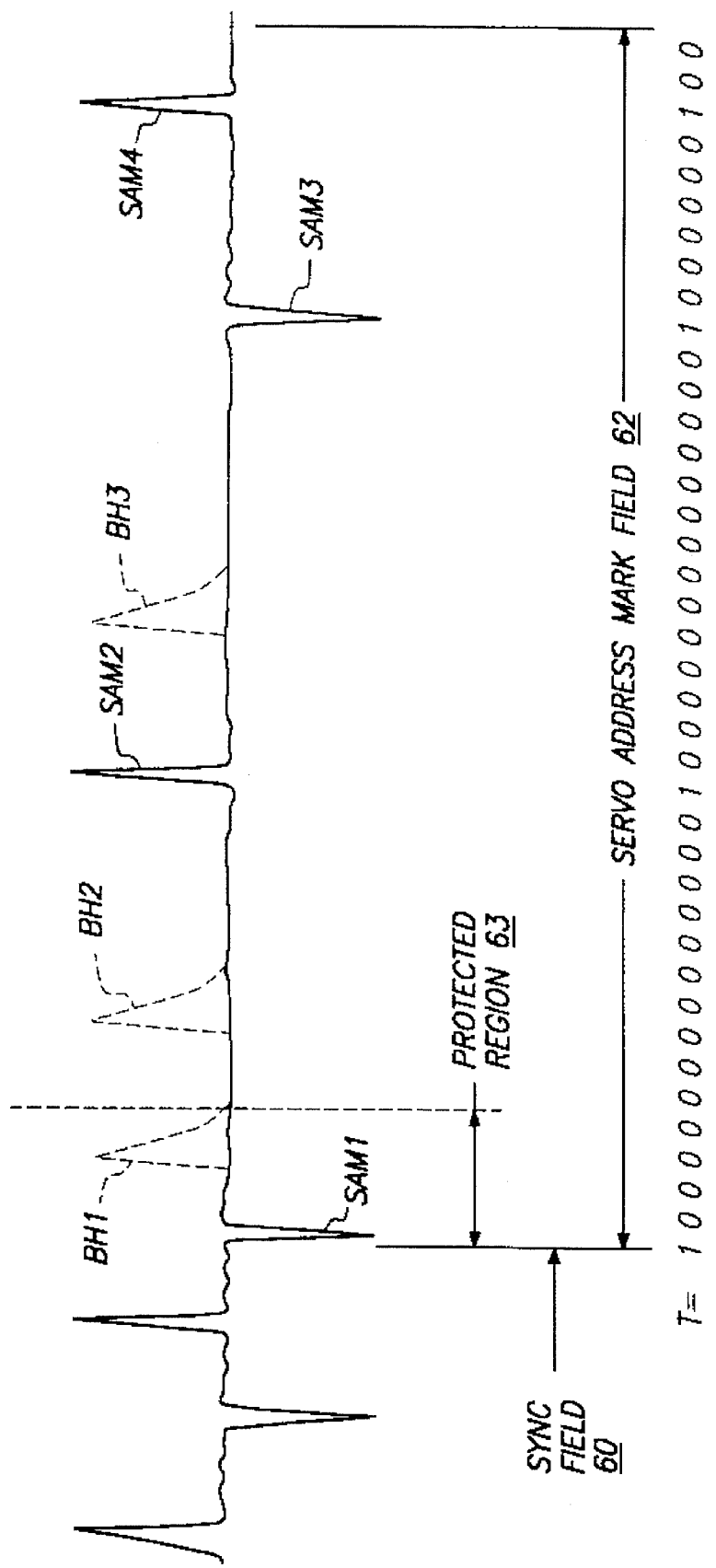
FIG. 3 is an enlarged, diagrammatic depiction of a servo address mark analog signal transition sequence in which three separate Barkhausen noise events are depicted by dashed outline waveform pulses superimposed upon the analog signal stream.

FIG. 3 illustrates the servo address mark sequence in the analog signal stream supplied by the preamplifier 26 to the pulse detector 42. In the FIG. 3 servo address mark example, the servo sync field pattern 60 is followed by four transition pulses SAM1, SAM2, SAM3 and SAM4. SAM2 is separated from SAM1 by fourteen clock cycles (T periods) in which no transition is nominally present. Similarly, SAM3 is separated from SAM2 by fourteen T periods. SAM4 follows SAM3 after six T periods. Three potential Barkhausen noise events, BH1, BH2 and BH3 are depicted in FIG. 3 by dashed lines of sharply rising, exponentially decaying pulses superimposed upon the analog servo address mark signal sequence. In accordance with principles of the present invention, if a single Barkhausen noise event, such as either the BH2 pulse or the BH3 pulse, occurs during the servo address mark sequence, the address mark may be successfully detected. However, if a Barkhausen noise event, such as the BH1 pulse, occurs in a protected region 63 immediately following the SAM 1 pulse, successful SAM detection will not occur, because the SAM detector 84 will not be able to distinguish the BH1 pulse from continuation of the sync field 60. Accordingly, the protected region 63 is made to be one T period longer than the period of the sync field 60. In the FIG. 3 example, the sync field 60 is recorded at a 3T repetition rate, and the protected region 63 is 4T in duration. If a 2T repetition rate for the sync field 60 were used, the protected region could be 3T in duration, for example. Also, it should be noted in connection with FIG. 3 that only one Barkhausen event can be tolerated within a single SAM sequence. If multiple Barkhausen noise events are present, as both BH2 and BH3 for example, a servo address mark will not be detected. It is statistically rare, but not impossible, for multiple Barkhausen noise events to occur during a single servo sector, and inside of the servo address mark field 62.

Figure 4:
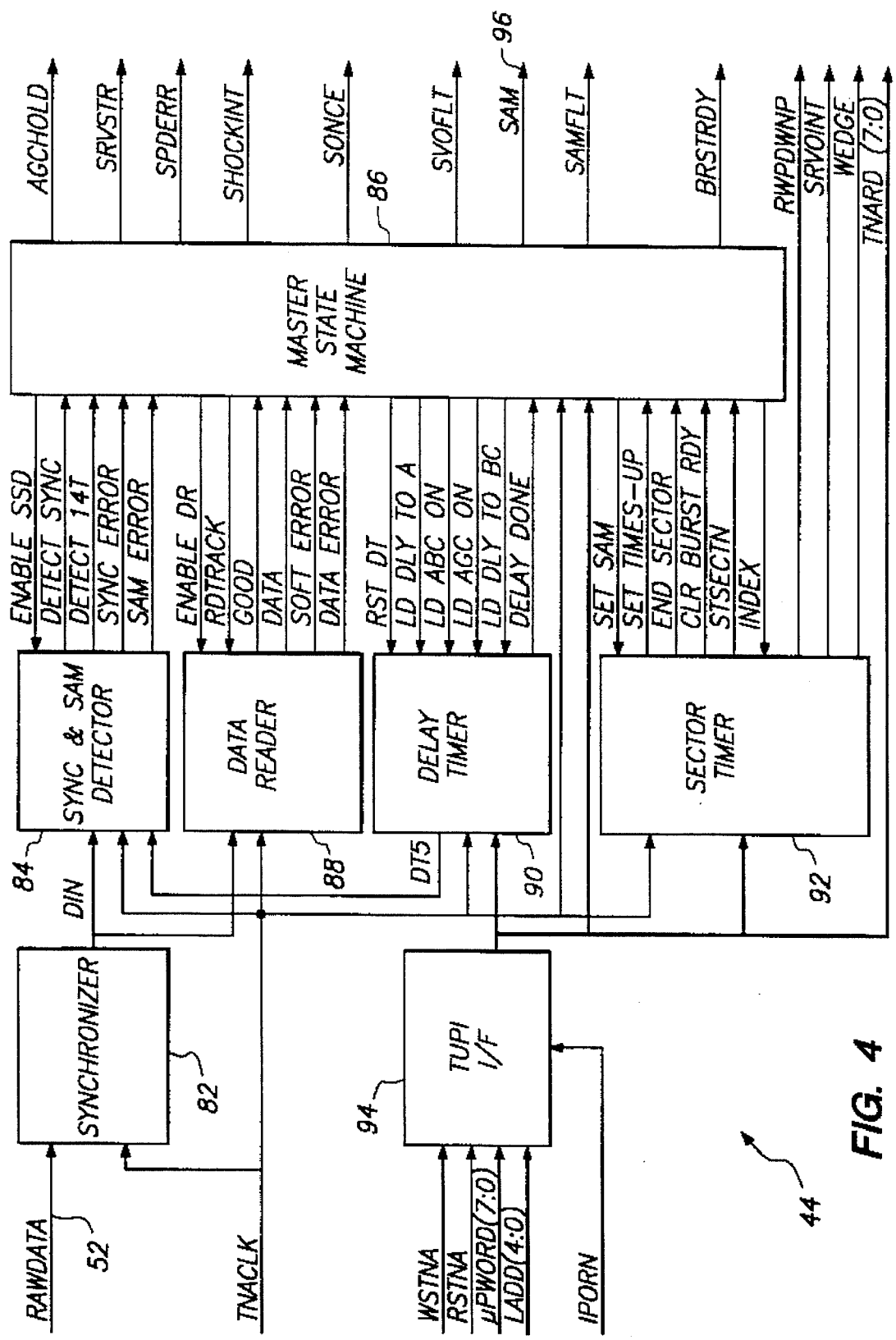
FIG. 4 is a more detailed block diagram of the servo detector circuit of FIG. 1 and includes a fault tolerant servo address mark detection function in accordance with principles of the present invention.

As shown in FIG. 4, the servo decoder 44 includes a synchronizer 82 which synchronizes each incoming raw data pulse supplied from the pulse detector 42 over the path 52 with a local logic clock (TNACLK). A synchronized output data signal enters the sync and SAM detector circuit 84 and a data reader circuit 88. The sync and SAM detector 84 detects the predefined patterns found respectively in the sync field 60 and the SAM field 62, and reports detection of these patterns to a master state machine 86 in accordance with the "SAM (TST102) signal graphed in FIG. 2. Among other functions, the master state machine 86 determines whether a servo address mark pattern has been detected by the sync and SAM detector 84. If the servo address mark pattern is found, a signal SAM line 96 leaving the master state machine 86 is set true. This signal is also applied internally within the servo decoder 44 to restart the sector timer 92.

The servo decoder 44 also includes a data reader 88 which determines the Gray coded data pattern recorded in the track ID field 64, as well as a once per revolution index pattern recorded in one of the embedded servo sectors 38 to provide a once-per-disk-revolution index mark, as is conventional within hard disk drives. Operational details of the synchronizer 82 and data reader 88 are given in U.S. Pat. No. 5,255,136 referred to above. The microprocessor interface 94 enables the microprocessor 30 to write to, and read from, control and status registers of the servo decoder 44. In this manner, the bits of the Gray-coded track ID number detected by the data reader 88 may be loaded into a register within the microprocessor interface 94, and then read by the microprocessor 30 at an appropriate time during its head position servo loop control interval.

The master state machine 86 enables and controls all of the other subordinate state machines and timers which aid in carrying out the overall servo detector function. The master state machine 86 is described in greater detail in commonly assigned, copending U.S. patent application Ser. No. 08/180, 096 filed on Jan. 11, 1994, which is a continuation of Ser. No. 07/710,172 filed on Jun. 4, 1991, by Moon et al., entitled: "Asynchronous Data Reader for Embedded Sector Servo Disk Drive" the disclosure thereof being incorporated herein by reference. The master state machine 86 enables the sync and SAM detector 84. After being enabled the sync and SAM detector 84 monitors the incoming synchronized data stream for valid sync and SAM patterns.

There are four mode bits which control the function of the sync and SAM detector 84. If a Sync2T bit is set, the sync and SAM detector 84 will look for a 2T sync pattern in the sync field 60, and if cleared, the detector 84 will look for a 3T sync pattern. If a Mode 9T bit is set, the detector 84 will look for 9T zero intervals between flux transitions within the servo address mark field 62, and if cleared, the detector 84 will look for 14T zero intervals between flux transitions within the servo address mark pattern, as graphed for example in FIG. 3. If a SamFaultMode bit is set, the detector 84 will operate in the fault tolerance mode in accordance with principles of the present invention. If the SamFaultMode bit is cleared, the detector 84 will not tolerate any Barkhausen noise events during the servo address mark field interval.

If a data bit (Barkhausen noise event) is received at an unexpected time within the servo address mark interval, a flag is set within the detector 84, and the detector 84 continues as if the unexpected data event was not present. If a second unexpected data bit or event is detected, the sync and SAM detector 84 flags a servo address mark error condition. If a Polarity Qualification bit is set, the sync and SAM detector 84 will expect that polarity qualification is being performed on the raw data input on the path 52. This bit requires a Barkhausen noise bit to be followed by a "missing" data bit. For example, if a Barkhausen noise spike causes a data bit to occur at 6T, then the sync and SAM detector will continue expecting a full 14T (or 9T) pattern, but it will flag an error if a data bit occurs at 14T (or 9T). The Polarity Qualification bit has no effect upon the sync and SAM detector 84 unless it is operating in the fault tolerant mode.

Since the incoming raw data on the path 52 is asynchronous, the patterns have a plus/minus one T period jitter, and the sync and SAM detector 84 therefore provides a plus/ minus one T period tolerance in detecting the 2T or 3T sync and 14T or 9T SAM patterns. Thus, a valid 2T sync pattern will be detected as 10 or 1(–T) or 100(+T); a valid 3T sync pattern will be detected as 100 or 10(–T) or 1000(+T); a valid 14T SAM pattern will be detected as 000 0000 0000 001 or 000 0000 0000 01 (–T) or 000 0000 0000 0001(+T). The sync and SAM detector 84 looks for these patterns and communicates each occurrence of SAM detection and each failure to detect SAM (error conditions) back to the master state machine 86.

The sync and SAM detector 84 first looks for three successive sync patterns and posts a "detect-sync" condition to the master state machine 86 to indicate that a valid sync pattern has been detected. If a valid sync pattern is not detected, the detector 84 posts a sync error condition to the master state machine 86. The detector 84 then looks for the SAM pattern and posts a "detect 14T for each 14T pattern detected (or "detect 9T" for each 9T pattern detected). If an error is detected while looking for the SAM pattern, the detector 84 posts a SAM error to the master state machine 86.

Figure 5A:
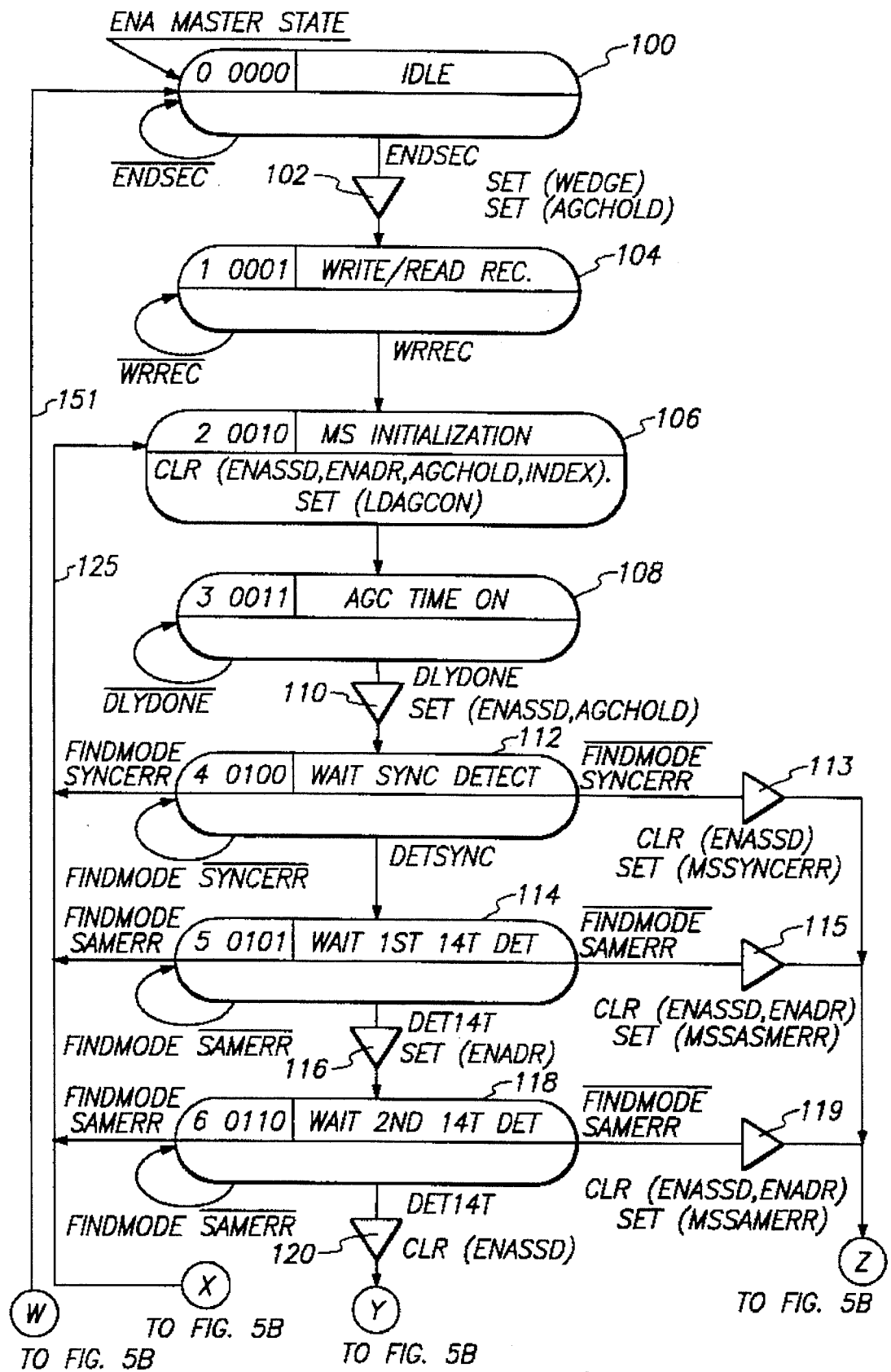
FIGS. 5A and 5B together provide a state diagram for the FIG. 4 servo detector circuit.
Figure 5B:
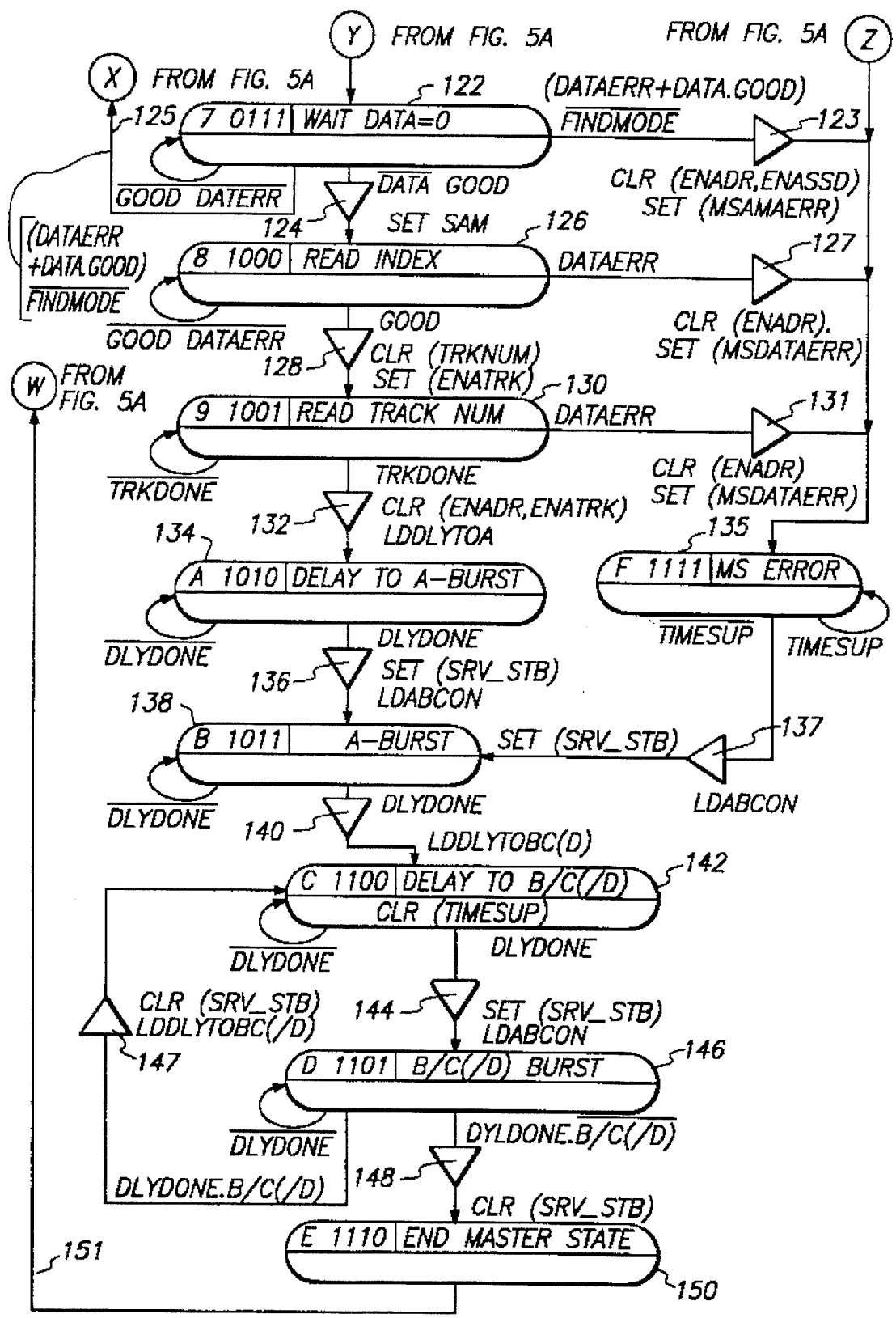

An overview of operation of the master state machine 86 is provided in the state diagram of FIGS. 5A and 5B. The master state machine 86 loops in an idle state 100 until the end of the data sector is reached as established by sector interval timed by the sector timer 92. When the next servo sector 38 is reached, a process node 102 sets the WEDGE signal, and it also sets the AGC Hold signal to true. A write-to-read recovery state 104 is reached at the beginning of the sync field 60, and it is in this interval that most, but not all, Barkhausen noise events occur as the head structure relaxes following switchoff of write current and switchon of the o preamplifier function for reading by the selected head 24.

Following write-to-read recovery, a master state initialization node 106 is reached and this state clears the enable control to the sync and SAM detector 84, clears the enable control to the data reader 86, clears the AGC hold output signal, clears the index signal, and sets a load control for loading an AGC on value into the delay timer 90. At the completion of the master state initialization node 106, an AGC time on node 108 is reached. The AGC time on node continues until the delay counter has reached a rollover count (ff) at which time a process node 110 is reached. The process node 110 sets the enable sync and SAM detector control, and sets the AGC hold control.

A wait sync done node 112 is then reached and the master state process waits at this node until a sync pattern is validly detected by the sync and SAM detector 84. This pattern may be two repetitions of 3T sync, and when the sync pattern is detected, a wait first 14T detection node 114 is reached. The master state process waits at this detection node 114 until the first 14T zero interval is detected by the sync and SAM detector 84. Once the first 14T zero interval of the SAM pattern is successfully detected, a process node 116 is reached which sets a control for enabling the data reader circuit 86, and a wait second 14T zero pattern interval node 118 is reached. The master state process remains at this second wait node 118 until the second 14T zero pattern interval is detected by the sync and SAM detector 84. Then a process node 120 clears the control enabling the sync and SAM detector 84 (since the data reader circuit 86 is now enabled). At this point, in reference to FIG. 3, pulses SAM1 and SAM2 have been detected, and the second 14T zero interval pattern has been detected.

Turning now to FIG. 5B, the master state machine awaits confirmation from the data reader that a zero data bit pattern has been detected (this is a 010 000 010 T pattern encompassing SAM3 and SAM4 pulses in FIG. 3). When the zero data bit pattern has been detected, a process node 124 is reached which causes the digital SAM signal (FIG. 2) to be asserted, meaning that the servo address mark has been successfully located.

Next, a read index pattern state 126 is reached which looks for the index pattern in one of the servo sectors and signals either that the sector includes the index pattern or includes a not-index pattern. A process node 128 then clears the track number register and sets an enable track number shift register within the master state machine. A read track number state 130 is then reached during which the patterns forming zero bit and one bit sequences defining the Gray coded track number are detected by the data reader 88. The detected data bits are then converted into binary and loaded into the shift register serially until all of the bits have been collected and the shift register contains the track number read from the track ID field 64. A process node 132 is reached which clears the enable data reader control signal, and clears the enable to the track number shift register and loads a delay to the A burst into the delay timer 90.

A delay to A-burst state 134 is reached which continues until the A burst is reached, as marked by the delay timer 90, at which time a servo burst mode is set and a burst duration time (ABC on) value is loaded into the delay timer 90. An A-burst state 138 then reached, and the master state machine 86 remains in this state while the A burst field 68 passes beneath the data transducer head 24. A process node 140 then causes a delay value to the next selected servo burst (either B, C or a D burst) to be loaded into the delay timer 90. Then, a second delay state 142 is reached, marking a time interval to either the B or C (or a D burst). After completion of the delay, a process node 144 sets a servo strobe output which selects the particular B, C or D burst field to be peak detected by the peak detector 46 (FIG. 1), and loads the burst duration count into the delay timer 90. Once the selected subsequent burst is reached, a second burst state 146 is entered, and the master state machine remains in this state 146 until the end of the second burst. A return via a process node 147 to the state 142 occurs when multiple subsequent bursts are to be read. The process node 147 clears the servo strobe and loads the delay to the next burst into the delay timer 90 and the process of states 142, 144 and 146 are repeated until complete. When the end of the servo sector 38 is reached, a process node 142 clears the servo strobe signal to the pulse detector, and an end state 150 is entered. The process then returns to the idle state 100 via a return path 151.

While not directly pertinent to the present invention, the master state machine has several modes, including a FIND-MODE which is invoked during a power on initialization sequence to find a first servo sector and follows a path 125 to restart the servo sector detection sequence; and, several fault condition process states 113, 115, 119, 123, 127, and 131. These fault condition process states all progress to a master state error state 135 which effectively bypasses the servo sector process down to the A burst process, so that if errors occur during the operation of the sync and SAM detector 84 or the data reader 88, it may still be possible to read the bursts and thereby obtain fine head position information.

Figure 6:
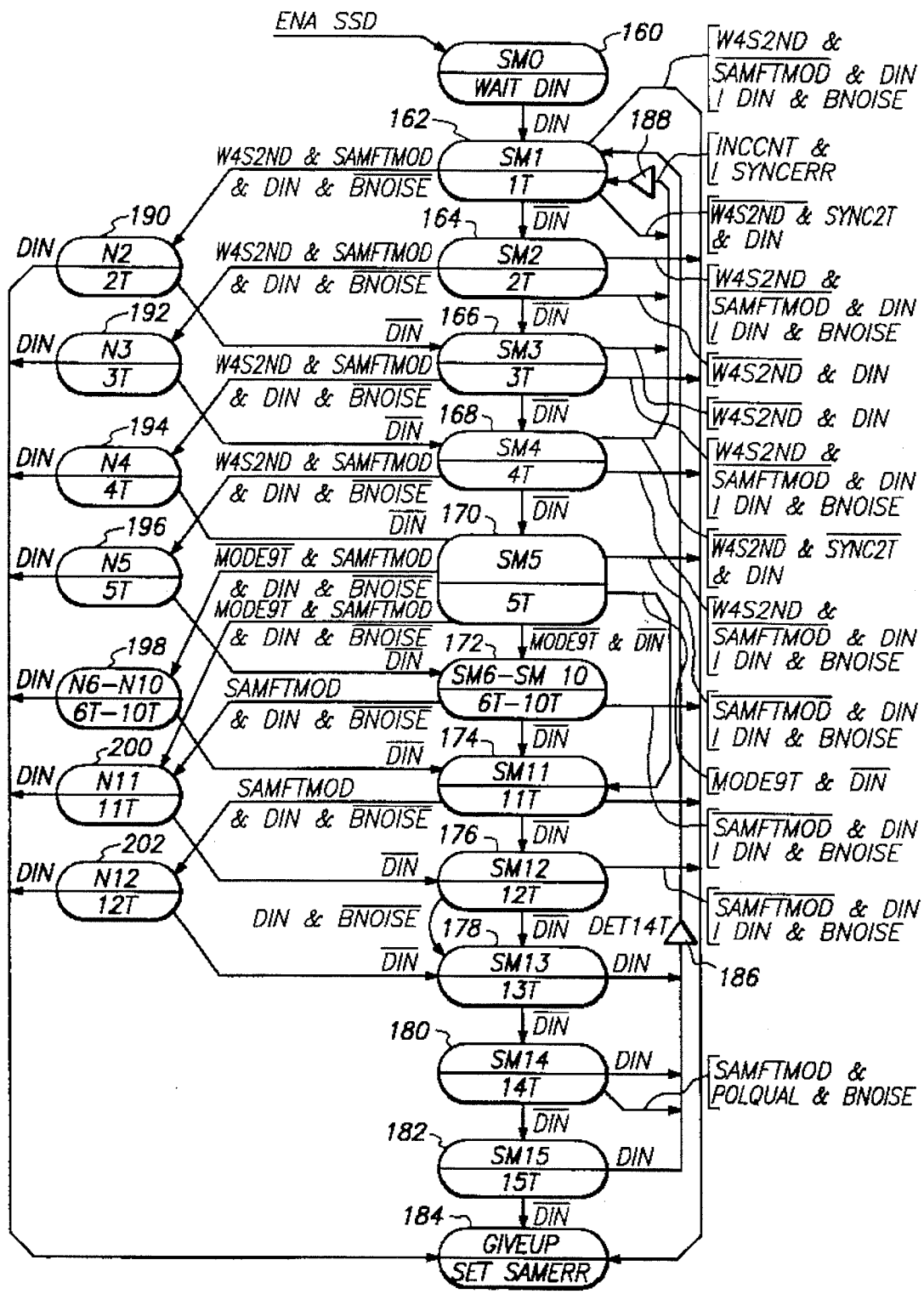
FIG. 6 is a state diagram for the fault tolerant servo address mark detection sub function carried out by a Sync/SAM decoder circuit within the FIG. 4 servo detector circuit.

FIG. 6 sets forth a state diagram of the fault tolerant sync and SAM detector circuit 84. After the sync and SAM detector circuit 84 has first been enabled by the master state machine 86 at state 110 (FIG. 5A), the sync and SAM detector 84 monitors the incoming synchronized raw digital data line (DIN) for valid sync and SAM patterns. Before monitoring the stream, the sync and SAM detector 84 is programmably configured by four control bit positions of a control register. If a SYNC2T bit is set, the detector 84 will look for a 2T sync pattern, and if this bit is not set the detector 84 will look for a 3T sync pattern. If a MODE9T control bit is set, the detector 84 will look for a 9T SAM zero interval pattern, and if not set, the detector 84 will look for a 14T SAM zero interval pattern. If a SAMFAULTMODE control bit is set, one "false" bit will be tolerated during the SAM pattern search. If a data bit is received at an unexpected time, a Barkhausen noise flag (BNOISE) is set and the sync and SAM detector state machine 84 continues on as if the unexpected data bit had not been detected. However, if a second unexpected data bit is detected, the sync and SAM detector 84 signals a SAM error condition to the master state machine 86. Finally, if a polarity qualification bit (POLQUAL) is set, the sync and SAM detector 84 (and the data reader 88) will expect that polarity qualification is being performed on the raw data input. In the sync and SAM detector 84, this bit requires a Barkhausen noise pulse to be followed by a "missing" data bit. For example, if a Barkhausen noise spike causes a data bit to occur at 6T, the sync and SAM detector circuit 84 will continue to expect a full 14T (or 9T) zero pattern interval, and will flag an error condition if a data bit occurs at 14T (or 9T). Polarity qualification has no effect on the sync and SAM detector 84 unless and until the fault tolerant mode (SAMFAULT-MODE) is enabled.

After the control bits have been set, and when the sync and SAM detector 84 has been enabled, the detector monitors the synchronized raw data line DIN to find three valid sync patterns ending with the SAM1 pulse and followed by a first valid 14T (or 9T) SAM zero interval ending with the SAM2 pulse. The detector 84 then monitors for a second valid 14T (or 9T) SAM zero interval ending with the SAM3 pulse, and the data reader then begins looking for the first complete Gray code zero value pattern beginning with the SAM3 pulse and including the SAM4 pulse. Once these patterns are found in sequence, the master state machine 86 determines that a valid SAM sequence is present and generates the SAM found signal at its state 124.

The incoming data DIN is derived from an asynchronous signal stream RAWDATA, and therefore DIN as synchronized by the synchronizer 82 manifests a plus or minus one T period of jitter. Accordingly, the sync and SAM detector 84 provides for a plus or minus one T cell timing tolerance in detecting the sync and SAM zero interval patterns. If, for example, the valid sync pattern is nominally 2T, then 1T(1), 2T (01) and 3T (001) patterns will qualify as a nominal 2T pattern. If, for example the valid sync pattern is 3T, then a 2T (01), 3T (001) and 4T (0001) pattern will qualify as a nominal 3T pattern. The same fault tolerance applies to the nominal 14T (or nominal 9T) SAM zero interval pattern.

Accordingly, after the sync and SAM detector 84 is enabled, a first operating state 160 of the sync and SAM detector 84 is reached. This enable occurs during the sync field 60 and the first function of the sync and SAM detector 84 is to detect repetitions of the sync pattern. The sync and SAM detector 84 remains in this initial state until a pulse (DIN) occurs. When a pulse comes in, one or more subsequent states 162, 164, 166 and/or 168 may be reached, depending upon whether the sync pattern is a 2T or a 3T pattern, and when the next data pulse is reached (keeping in mind the plus and minus one T period fault tolerance built into the sync and SAM detector 84. When a next sync pulse is received at a subsequent state (e.g. one of states 162, 164, 166 or 168), a process node 188 is reached which puts out a control value to the master state machine to increment a sync pattern counter (INCCNT), until a predetermined number of valid sync patterns are detected. Following the node 188, the sync and SAM detector 84 returns to state 162 and the progression of states is repeated until three sync patterns have been found.

At a point the first servo address mark pulse (SAM1) will be detected as the final pulse within the sync pattern (at one of states 162, 164, 166 or 168) and a return will be made to state 162. In the nominal case, no pulse will be encountered for 14T intervals (or for 9T intervals if the 9T flag is set). In this nominal case, for each T interval without a data pulse on the DIN line, the sync and SAM detector 84 will progress through a state. In the 14T case, states 164, 166, 168, 170, 172 (representing intervals T6–T10) 174, 176 will be traversed. Depending upon actual time of arrival of the next pulse (SAM2), it will be detected at one of states 178, 180 or 182. Upon detection, a process state 185 generates a SAM sequence found signal (DET14T) and sends this signal to the master state machine. This event also triggers a second SAM interval flag (W4S2ND), which is set the second time the sync and SAM detector looks for the SAM zero interval pattern. If the sync and SAM detector 84 is operating in the 9T mode, state 172 is skipped.

If the sync and SAM detector 84 is not operating in the fault tolerant mode, and an unexpected data pulse occurs at any one of the states 164, 166, 168, 170, 172, 174, or 176, the error state 184 is reached, and a SAM error is sent to the master state machine. Also, if the second SAM interval flag (W4S2ND) is not set, and a pulse is unexpectedly received at states 162, 164, 166 or 168, the process state 188 signals a sync error condition to the master state machine. This procedure effectively provides the protected region 63 graphed in FIG. 3, and if a Barkhausen noise spike, such as BH1, occurs within the protected region, one of the states 162, 164, 166 or 168 will detect its occurrence and cause the sync error to be flagged.

If, after the second SAM interval flag (W4S2ND) is set and the sync and SAM detector 84 is operating in the fault tolerant mode, and a first unexpected data pulse occurs at state 162, a first noise state 190 is reached. If, at the next T interval, a data pulse is not received, the detector 84 progresses to state 166, and the Barkhausen noise flag (BNOISE) is set. Similarly, if at the 2T interval of state 164, a first noise pulse is received, the detector progresses to noise state 192. If at the next T interval, a data pulse is not received, the detector 84 progresses to state 168 and the BNOISE is set. If an unexpected pulse is reached at state 166, a noise state 194 is reached, the B NOISE flag is set, and if at the next T interval a data pulse is not received, the detector progresses to state 170. If an unexpected pulse is detected at state 168, a noise state 196 is reached, the BNOISE flag is set, and a return is made to state 172 if no pulse is received at the next T interval.

Without regard to the second SAM interval flag (W4S2ND) (because the detector 84 has progressed beyond the protected region 63 in its first pass), or is in its second pass, if an unexpected pulse is detected at state 170, a noise state 198 is reached, the BNOISE flag is set, and a return is made to state 174. If an unexpected pulse is detected at state 172 (during 6T to 10T), a noise state 200 is reached, the BNOISE flag is set, and a return is made to state 176. If an unexpected pulse is detected at state 174, a noise state 202 is reached, the BNOISE flag is set, and a return is made to state 178. If an unexpected pulse is detected at state 176, the BNOISE flag is set and the detector 84 progresses to state 178.

If any of the noise states 190, 192, 194, 196, 198, 200, 202, is reached with the BNOISE flag set, the error state 184 is reached, as the detector 84 will not tolerate more than a single unexpected pulse within a SAM interval 62. If the BNOISE flag is set when an unexpected data pulse occurs at state 176, the error state 184 is also reached.

Figure 7A:
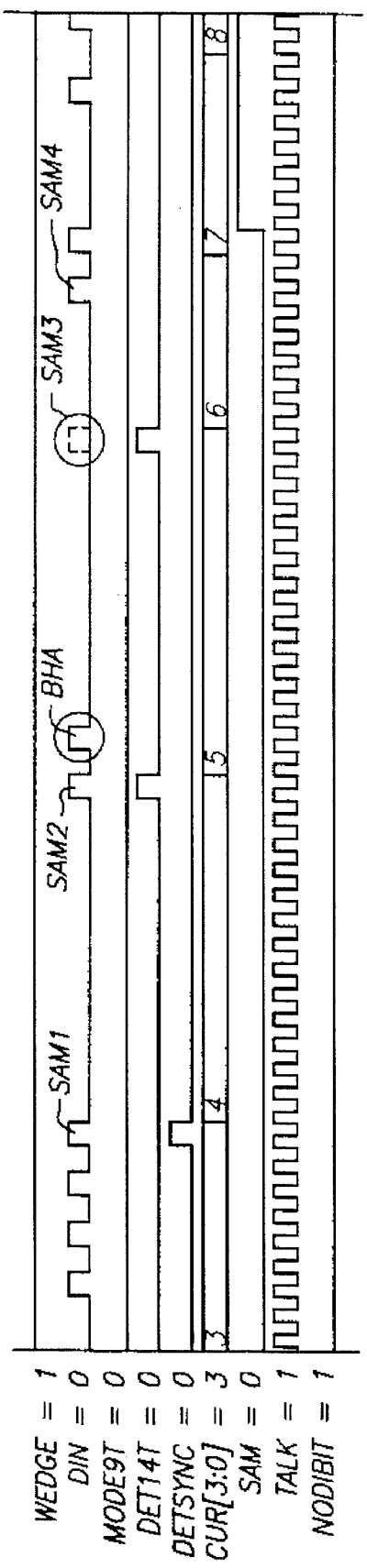
FIGS. 7A, 7B, 7C, 7D, 7E, and 7F comprise a series of digital signal waveform graphs illustrating operation of the FIG. 4 servo detector in detecting servo address marks within the presence of variously illustrated Barkhausen noise conditions and operating conditions.
Figure 7B:
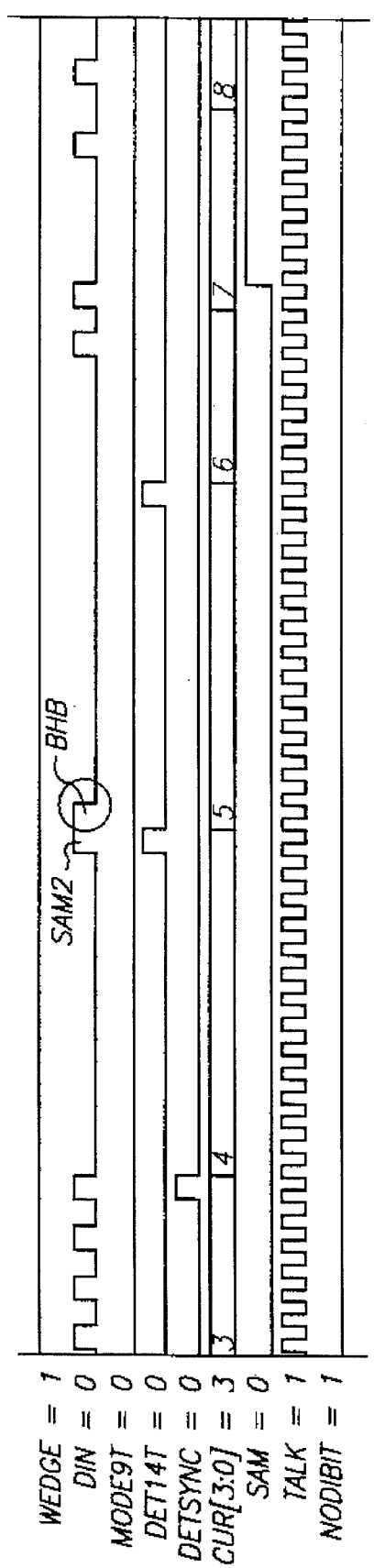

FIG. 7A illustrates a detection sequence in which an unexpected pulse BHA resulting from e.g a Barkhausen noise event occurs several T intervals after the second SAM pulse SAM2. Because the detector 84 is operating in a pulse polarity or "dibit" mode, the presence of the unexpected pulse BHA "sets" the read channel and the next expected pulse SAM3 (shown in dashed outline form) will not be detected by the pulse detector 42. However, in this example, since there is only one unexpected pulse, and the detector 84 is operating in the fault tolerant mode, the SAM found condition will be signaled by the master state machine 86. In the example of FIG. 7B, the unexpected pulse BHB crowds the expected pulse SAM2, and the SAM found condition will be signaled.

Figure 7C:
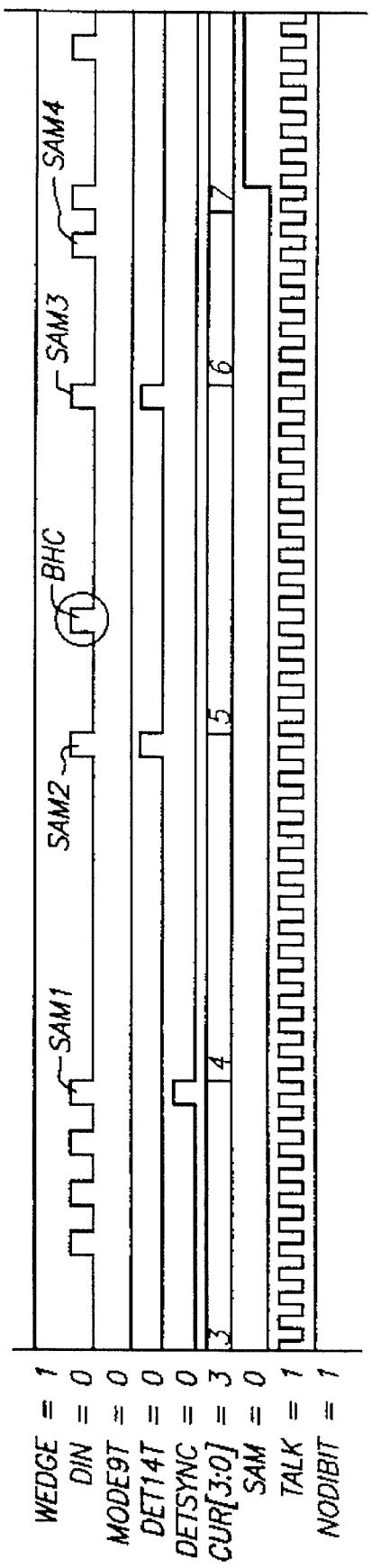
Figure 7D:
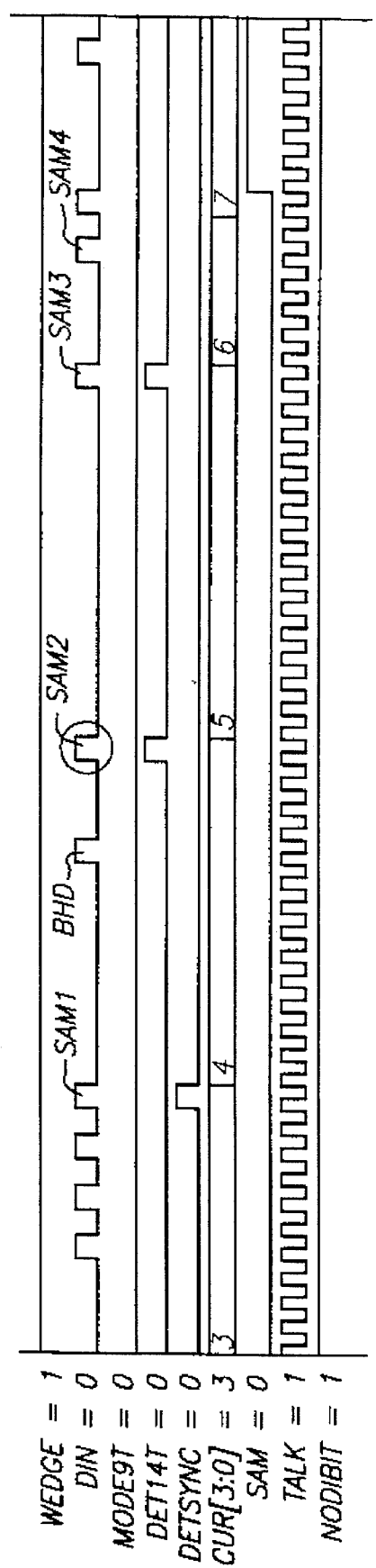

In the example of FIG. 7C, an unexpected pulse BHC occurs while the detector 84 is in the non-pulse polarity operating condition, and a valid SAM found condition is signaled, even though the detector detects the expected SAM3 pulse, unlike the dibit examples given in FIGS. 7A and 7B. In FIG. 7D, an unexpected pulse BHD occurs during the first 14T interval, but beyond the initial protection region. In this example, the detector 84 also detects expected SAM1, SAM2 and SAM3 pulses, and the data reader 88 detects SAM3 and SAM4 and completes the detection of the SAM pattern, and the master state machine 86 signals SAM found.

Figure 7E:
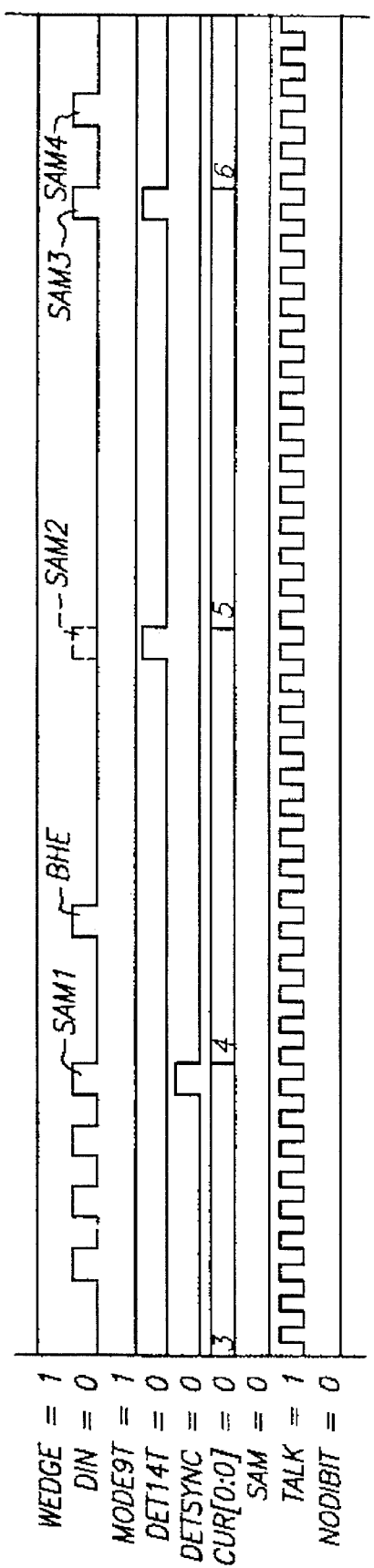

In the example of FIG. 7E, an unexpected pulse B HE occurs within the protected region 63 within the first 14T zero transition interval. In this example the detector 84 is operating in the polarity-sensitive mode, and the expected pulse SAM2 is not detected. However, since the unexpected pulse BHE occurs within the protected region, no SAM found will be signaled, even though failure to detect the expected pulse SAM2 would not otherwise result in a failure to find a valid SAM interval, as explained above.

Figure 7F:
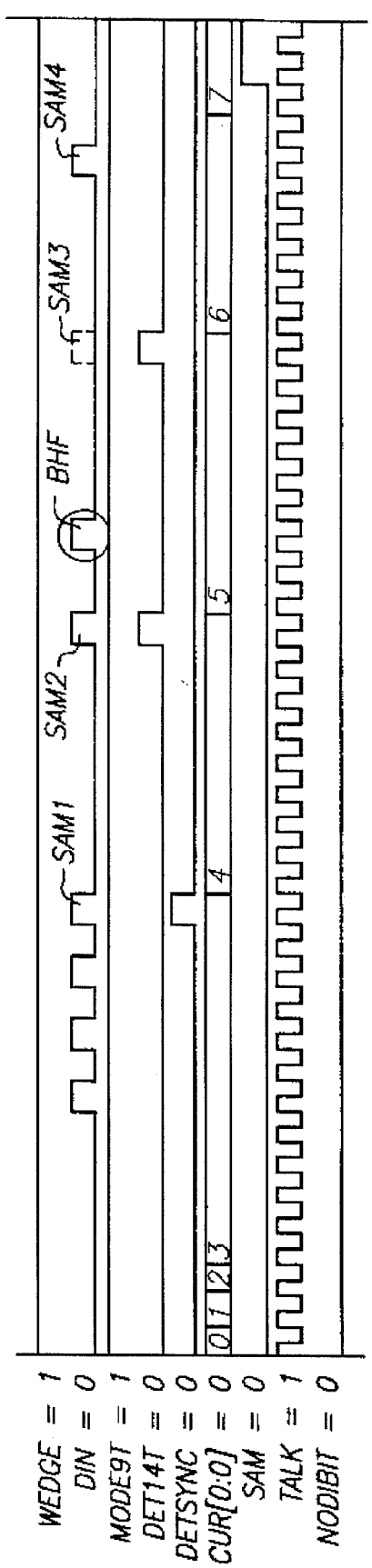

Other examples can be provided for the 9T interval pattern. One is provided by FIG. 7F. Thus, in FIG. 7F, an unexpected noise pulse BHF occurs during the second 9T interval. Since the peak detector 42 is operating in the pulse-polarity mode, it fails to detect the third SAM pulse SAM3, but the sync and SAM detector 84 still signals the master state machine that the second 9T pattern has been found by inserting the missing SAM3 pulse into the signal stream.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method for decoding a data pulse sequence from a stream including a servo address mark pattern following a synchronization pattern comprising a repetitive sequence of data pulses, wherein the servo address mark pattern nominally comprises a first non-pulse interval of predetermined length following the synchronization pattern and ending with an interval ending pulse, with fault tolerance for a spurious data pulse occurring during the first non-pulse interval, including the steps of:

detecting a last data pulse of the synchronization pattern nominally marking a beginning of the first non-pulse interval of the servo address mark pattern, progressively monitoring the stream to determine that the synchronization pattern has ended, continuing to monitor the stream to determine that no unexpected data pulses occur during the first non-pulse interval, detecting an unexpected pulse during the first non-pulse interval occurring following the step of determining that the synchronization pattern has ended, flagging presence of the detected unexpected pulse, and continuing to monitor the stream to detect the interval ending pulse, and thereupon signaling successful detection of the first non-pulse interval.

2. A method for detecting occurrence of a non-pulse interval of predetermined length between a beginning pulse and an ending pulse as included within a sequence comprising a unique timing mark within a stream of pulses supplied from a source with a state machine comprising the steps of:

advancing through a plurality of nominal states marking in time the non-pulse interval, branching to one of a plurality of available spurious pulse states from one of the nominal states upon detection of a first unexpected pulse, returning to advance through predetermined remaining ones of the plurality of nominal states following detection of the first unexpected pulse, reaching a completion state following the nominal states if only the first unexpected pulse is detected, and reaching an error state following a branch to another one of the plurality of available spurious pulse states upon detection of a second unexpected pulse within the non-pulse interval.

3. The method set forth in claim 2 for a plurality of non-pulse intervals by repeating the steps of claim 2 for each interval and comprising the step of reaching the error state upon detection of a second unexpected pulse within any one of the non-pulse intervals.

4. In a disk drive including a rotating data storage disk and a transducer positioned to read data from a data track selected from a multiplicity of concentric data tracks defined on a storage surface of the rotating data storage disk, wherein servo sectors are embedded within the data tracks, a method for locating the servo sectors by decoding a servo address mark pattern defined within each servo sector and marking a precise radial position of the rotating disk relative to the transducer for resetting a servo sector timer, the servo sector including a repetitive sequence of data pulses comprising a sync pattern, and the servo address mark pattern including a plurality of non-pulse intervals of predetermined length spanned by data pulses, with fault tolerance for a spurious data pulse occurring during one of the non-pulse intervals, the method including the steps of:

positioning the transducer over a selected one of the data tracks and reading magnetic flux transitions recorded therein including ones nominally corresponding to one of the servo sectors, converting the magnetic flux transitions into a stream of data pulses, monitoring the stream of data pulses with a sync detection circuit to detect the sequence of pulses comprising the synchronization pattern, monitoring the stream of data pulses with a servo address mark pattern detection circuit to detect a last occurring data pulse of the synchronization pattern nominally marking a beginning of a first non-pulse interval of the plurality thereof, monitoring the stream during the first non-pulse interval to determine that the length thereof corresponds to a predetermined nominal length, detecting a pulse marking an end of the non-pulse interval, monitoring the stream during each subsequent non-pulse interval to determine that the length thereof corresponds to predetermined nominal lengths, signaling detection of the plurality of non-pulse intervals at an end of a last one thereof, setting a flag upon detection of a first unexpected pulse detected during one of the non-pulse intervals without cessation of monitoring, and ceasing to monitor the stream during one of the non-pulse intervals upon detection of a second unexpected pulse.

5. In a disk drive including a rotating data storage disk and a transducer positioned to read data from a data track selected from a multiplicity of concentric data tracks defined on a storage surface of the rotating data storage disk, servo sectors including a sync pattern, a servo address mark pattern, and head position information embedded within the data tracks, a servo pattern decoder for decoding the sync pattern, the servo address mark pattern, and the head position information, and wherein the servo address mark pattern comprises at least one non-pulse interval spanned by two pulses, an improved servo address mark pattern detector state machine for detecting the non-pulse interval even in the presence of one unexpected pulse received during the non-pulse interval, comprising:

- a series of sequential nominal states progressively reached by the state machine during each timing increment of the non-pulse interval,
- a series of noise states, one of which is reached by the state machine upon receipt of the one unexpected pulse during the non-pulse interval,
- an electrical path leading back from the said one of the series of noise states to a predetermined one of the series of sequential nominal states following receipt of the one unexpected pulse, and
- an electrical path leading to an error state from any of the series of sequential nominal states and any of the series of noise states upon receipt during the non-pulse interval of a second unexpected pulse.

6. The disk drive set forth in claim 5 wherein the servo address mark pattern detector state machine comprises a last nominal state for detecting a pulse marking the end of the non-pulse interval and a process state reached by the state machine after passing through the last nominal state for signaling the servo pattern decoder that the non-pulse interval has been successfully detected.

7. The disk drive set forth in claim 6 wherein the servo address mark comprises a plurality of sequential non-pulse intervals separated by a pulse and wherein the process state causes the state machine to return to a first of the series of sequential nominal states upon detection by the last nominal state of the pulse marking the end of one of the plurality of non-pulse intervals.

8. The disk drive set forth in claim 5 wherein the servo address mark pattern detector state machine comprises means for detecting the sync pattern.

9. The disk drive set forth in claim 6 wherein the state machine comprises a plurality last nominal states, one of the plurality thereof being reached by the state machine upon detection of the pulse marking the end of the non-pulse interval within plus and minus one pulse timing cell.

10. The disk drive set forth in claim 6 wherein the servo pattern decoder further includes a data reader for reading sequences of pulses and non-pulse intervals comprising data bits forming a track number, wherein the servo address mark pattern comprises a plurality of sequential non-pulse intervals separated by a pulse and ends with a predetermined one of the data bit sequences, and wherein the servo address mark pattern detector state machine comprises a last nominal state for detecting a pulse marking the end of each non-pulse interval, and a process state reached by the state machine after passing through the last nominal state for signaling the servo pattern decoder that the non-pulse interval has been successfully detected, and wherein the servo pattern decoder enables the data reader for reading the predetermined one of the data bit sequences upon a signal from the state machine at the end of the last non-pulse interval.

11. The disk drive set forth in claim 10 wherein the servo pattern decoder includes a sector timer for timing an interval between successive adjacent servo sectors, and wherein the servo pattern decoder resets the sector timer when the data reader has read the predetermined one of the data bit sequences of the servo address mark pattern being read.

\* \* \* \* \*